United States Patent [19]
Garvey

[11] 3,820,650
[45] June 28, 1974

[54] SANITARY ENDLESS BELT CONVEYOR
[75] Inventor: Francis J. Garvey, Newfield, N.J.
[73] Assignee: Garvey Corporation, Blue Anchor, N.J.
[22] Filed: June 28, 1972
[21] Appl. No.: 267,062

[52] U.S. Cl. .............................. 198/204, 198/192 R
[51] Int. Cl. .......................................... B65g 15/60
[58] Field of Search .......... 198/192, 204, 206, 191; 248/226 R, 230

[56] References Cited
UNITED STATES PATENTS

| | | | |
|---|---|---|---|
| 1,231,495 | 6/1917 | Cleaver et al. | 198/192 |
| 2,922,512 | 1/1960 | Lo Presti | 198/192 |
| 3,035,683 | 5/1962 | Bishop | 198/204 |
| 3,190,648 | 6/1965 | Kallenbach | 248/230 |
| 3,318,561 | 5/1967 | Finke et al. | 248/230 |
| 3,409,259 | 11/1968 | Cross | 248/230 |

FOREIGN PATENTS OR APPLICATIONS
1,010,892  11/1965  Great Britain ................... 198/192

Primary Examiner—Evon C. Blunk
Assistant Examiner—Joseph E. Valenza
Attorney, Agent, or Firm—Albert H. Kirchner

[57] ABSTRACT

An endless belt conveyor system, intended particularly for the handling of food materials and ingredients, medicaments and the like, in bulk or in containers during the filling operation, is formed of modules and other components capable of being readily assembled and disassembled in a wide range of selected elements to provide installations of different desired lengths and heights, mounted by structural framing and other parts joined in point contact or very short line contact so as to leave minimal space for the lodging of spilled material and other foreign matter and facilitate periodic cleaning by steam, water jets or the like.

5 Claims, 10 Drawing Figures

3,820,650

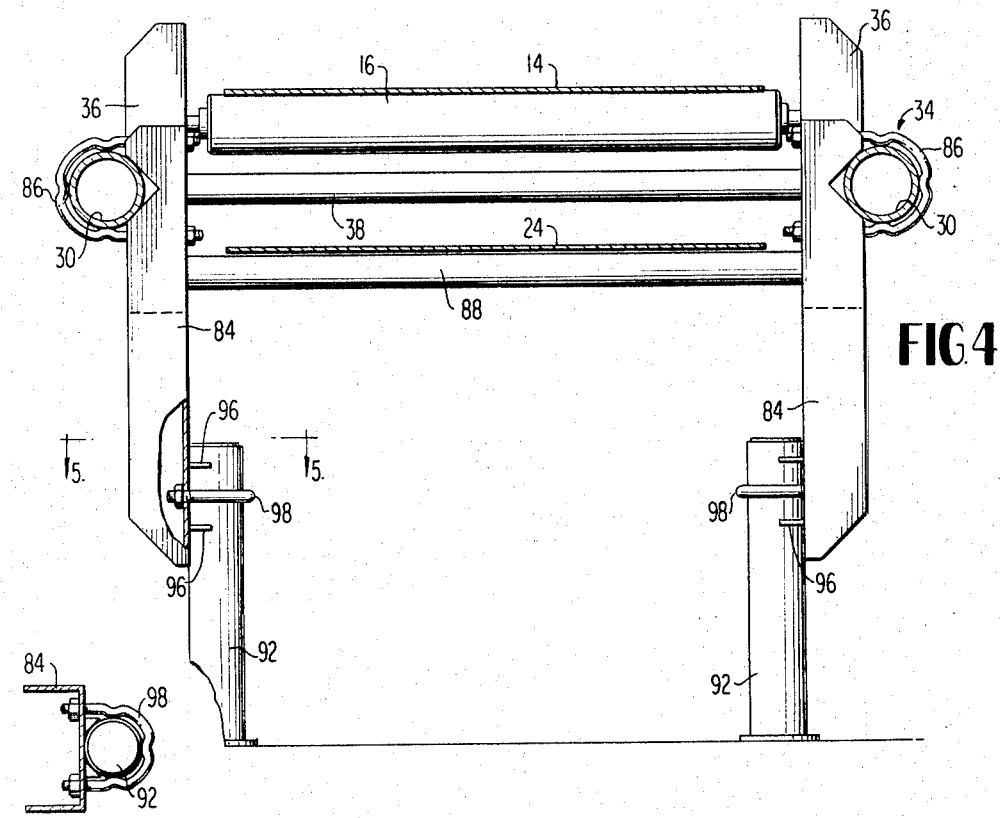
FIG.4
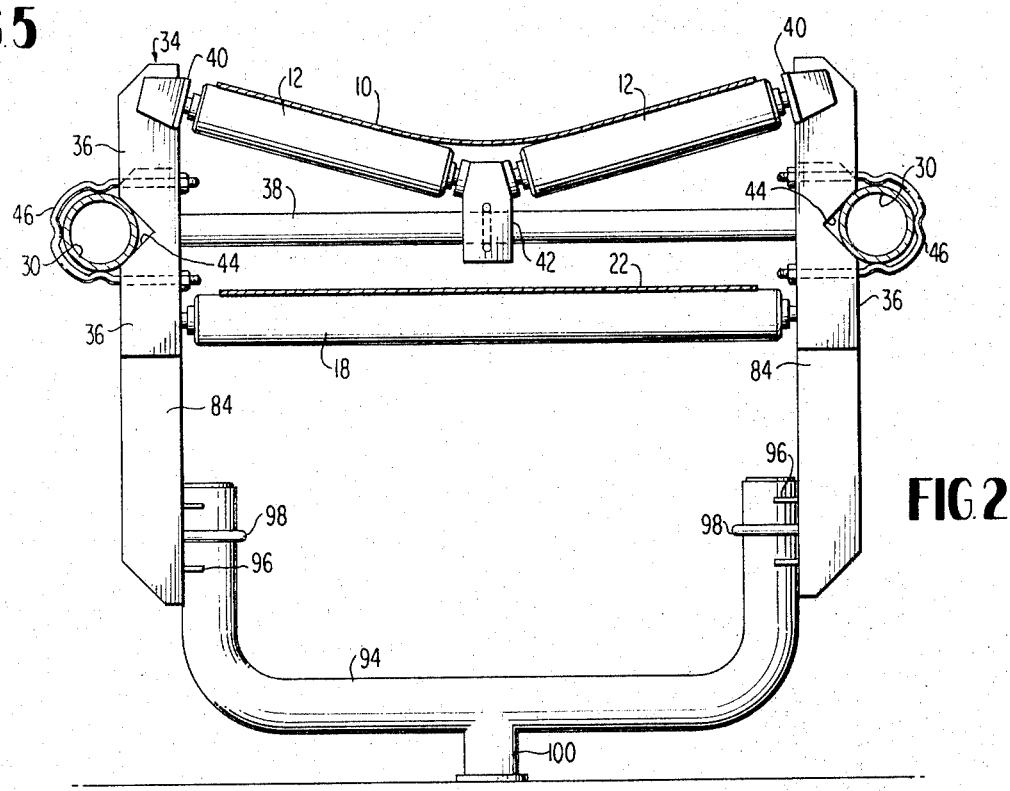
FIG.5
FIG.2

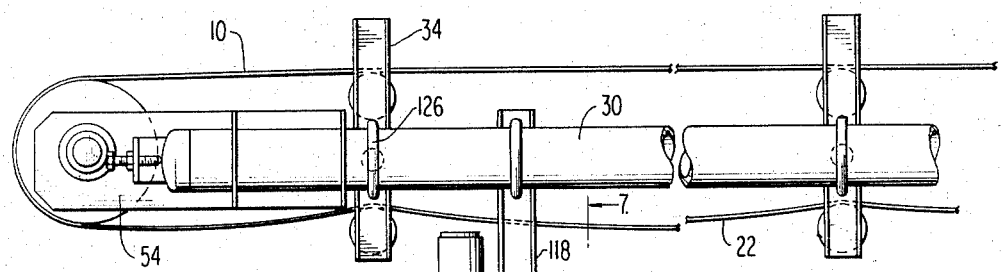
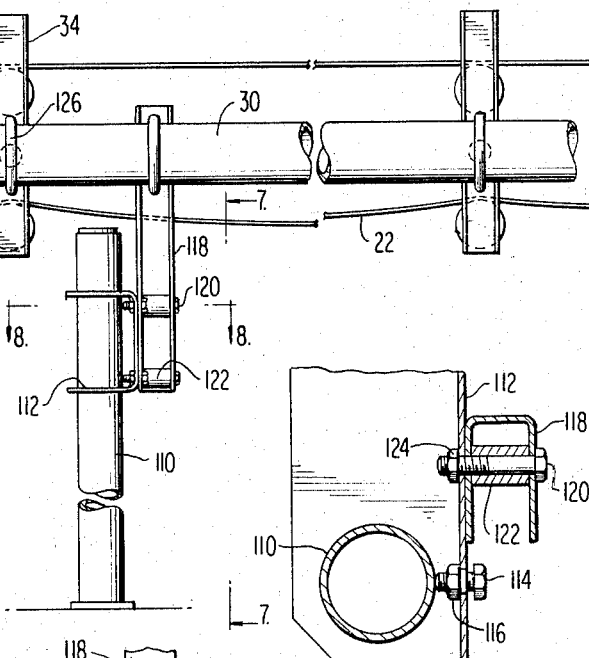
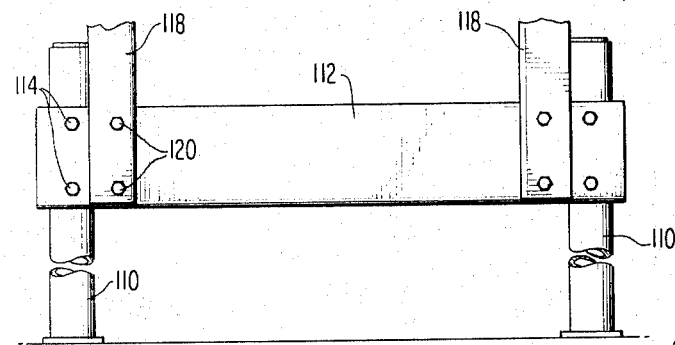
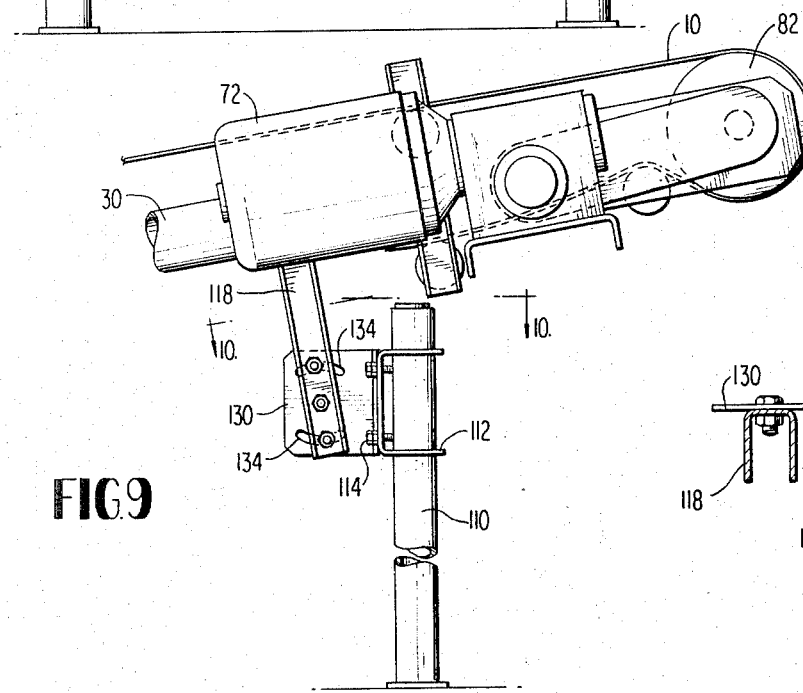

SANITARY ENDLESS BELT CONVEYOR

DESCRIPTION

BACKGROUND OF THE INVENTION

In connection with the manufacture, processing, packaging and analogous handling of many kinds of materials intended for human consumption, such as foods and ingredients of foods, medicines and the like, frequently in the form of comminuted solids, in granular or pulverulent form, it is necessary to effect movement between operating stations by means of an endless belt conveyor. Inevitably, during long periods of running of the belt, some spillage is apt to occur, so that the material fouls the belt and parts of the supporting structure. This requires periodic cleaning which in the case of many industries must be very complete and quite perfect, resulting in removal of all spilled matter, particularly from structural joints in the apparatus where accumulations have lodged and sometimes resist quite diligent cleaning efforts. In the past many such joints have been numerous and lengthy, forming sometimes deep and long recesses where the deposits have become hard to reach by the conventional jets of steam, hot water, detergent and antiseptic solutions and the like used in the regular cleaning operations. The result is the economic loss incurred by increased washing labor, lengthened shutdown times, and more frequent complete dismantling of the apparatus for more perfect sanitization.

In some cases it has been attempted to solve the problem by welding the joints, or filling them with weldment or caulking material, but this has been found objectionable as militating against disassembly and reassembly of the parts, and for other reasons.

The present invention aims to solve the problem by providing a set of components that can be easily assembled into any of a large number of varied conveyor lengths, and be equally readily disassembled and reconstructed, formed by parts joined together in joints and connections offering minimal lodging space for spillage and the like and capable of being flushed out quite completely by the usual fluid cleaning jets and sprays.

SUMMARY OF THE INVENTION

The new conveyor system comprises substantially conventional endless belt runs with improved mounting means. The latter comprises head and tail modules, one of which includes a drive roller and the other of which mounts an idler roller, with intermediate idler rollers mounted on supporting legs which are U-bolted to longitudinal framing elements in the form of long tubular or rod-like members, which may conveniently be cut in situ from standard pipe stock.

For a high degree of versatility and adaptability to suit varying requirements of overall length, vertical elevation and other variable factors, and to facilitate periodic complete cleaning, the connections of the head and tail modules to the frame longitudinals, and of the intermediate rollers to the longitudinals, and of the leg sections to each other, are all made for ready assembly and disassembly by parts that fit together in joints forming no more than point contact, or extremely short line contact. Thus the assembly eliminates joints forming crevices, cracks and narrow recesses such as have heretofore characterized most of the prior art installations, including particularly such as have been designed for ready assembly and disassembly, which have been highly objectionable as providing lodging for spilled material, dust and dirt, and considerably complicating the regularly required operation of completely cleaning the apparatus between daily shutdowns.

To provide a still further degree of versatility, and to effectuate economies in shipping and installation, a feature of the invention comprises providing the parts in which may be considered a type of kit consisting of such parts as head and tail roller assemblies and intermediate roller assemblies, each of which mounts an appropriate roller and includes specially designed side frames, in combination with special U-bolts adapted to fasten the frames, including any desired number of intermediate frames, to longitudinal frame members cut by the purchaser or installer in situ from conventional pipe stock to whatever length may be required for the particular installation. If desired or required, there may be included in the kit a number of leg structures each similarly connectible to the longitudinal frame members.

SHORT DESCRIPTION OF THE DRAWINGS

In the accompanying drawings, which illustrate certain embodiments of the invention which have been reduced to actual practice and found to give satisfactory results and which are accordingly at present preferred, FIG. 1 is a side elevational view of a complete assembly of modules and framing components constructed in accordance with the principles of the invention;

FIG. 2 is a vertical transverse sectional view taken on the line 2—2 of FIG. 1;

FIG. 4 is a vertical transverse sectional view taken on the line 4—4 of FIG. 3;

FIG. 5 is a detail horizontal cross-sectional view taken on the line 5—5 of FIG. 4;

FIG. 6 is a detail side elevational view, like the left hand end portion of FIG. 1, but showing a modified form of supporting leg structure;

FIG. 7 is an end elevational view of the leg structure of FIG. 6, taken as a cross-section through the conveyor on the line 7—7 of FIG. 6;

FIG. 8 is a detail horizontal cross-sectional view taken on the line 8—8 of FIG. 6;

FIG. 9 is a detail side elevational view, like the right hand end portion of FIG. 1, but showing a still further modified form of supporting leg structure; and FIG. 10 is a detail horizontal cross-sectional view taken on the ine 10—10 of FIG. 9.

DESCRIPTION OF THE PREFERRED EMBODIMENTS

Figure 1:
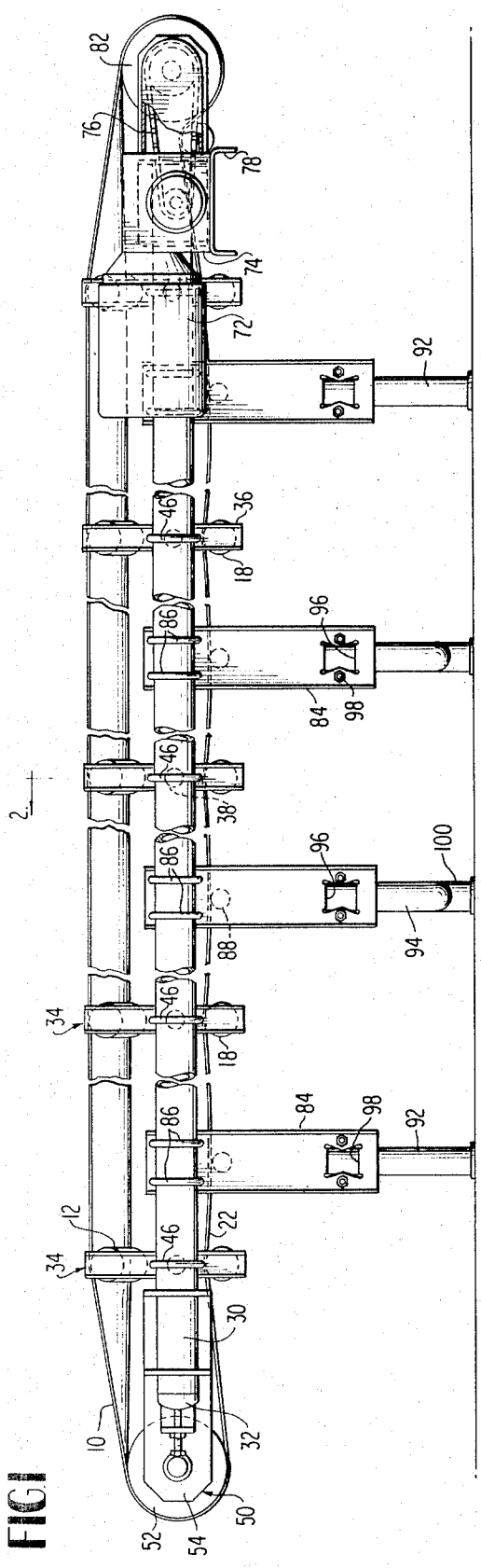
Figure 3:
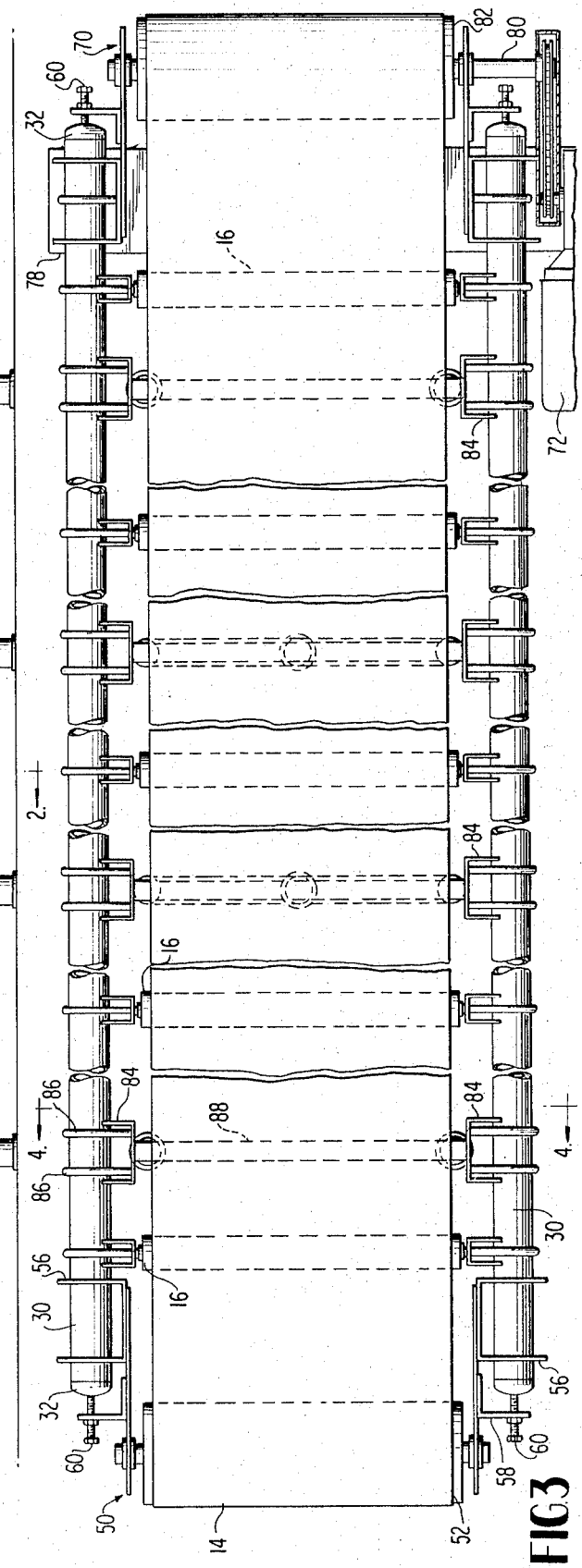
FIG. 3 is a top plan view of an assembly which is generally the same as that of FIG. 1 but includes single straight axis rollers providing a flat operative run of the belt instead of the double, angularly-related rollers which provide the troughed run of the belt in FIG. 1.

In these figures, the endless belt of FIGS. 1 and 2, providing the trough-shaped upper or operative run 10 by means of the sets of double angularly-related upper rollers 12, differs only incidentally and not critically with respect to the principles of the invention from the endless belt of FIGS. 3 and 4 which provides the flat upper or operative run 14 by means of the series of single, straight-axis rollers 16. The return rollers are shown at 18 in FIG. 1, and identical return rollers are used in the embodiment of FIGS. 3 and 4 but are not seen in those figures, being masked by other foreground structures. The flat return runs 22 of FIGS. 1 and 2 and those shown at 24 in FIG. 4 are identical.

The mounting of the rollers, and hence of the belt, in the supporting framework of the apparatus constitutes an important part of the invention and is similar in the two embodiments. It will be described first in connection with FIGS. 1 and 2.

After determining the length desired for a particular installation, two longitudinal framing members 30 are cut from 2 inch stainless steel or equivalent standard pipe stock, each approximately 6 inches shorter than the desired overall conveyor length, and a cap 32 is plugged into each end and sealed as with a suitable epoxy or silicone paste. With these members set up in laterally spaced parallelism on a temporary support, such as two or more sawhorses, an intermediate roller assembly 34 is mounted on the members approximately ten inches from each end. In each of these assemblies two short lengths of channel stock forming roller supports 36 are spaced apart by a cross bar 38 which has its ends secured by cap screws to the other surfaces of the two roller supports 36, about midway their height, with the flanges of the channels facing oppositely outwardly. Bolted to the upper end portions of the supports are brackets 40 providing bearings in which are journaled the pintles at one end, i.e., the outer end, of each of the pair of rollers 12. The pintles at the other or inner ends of the two rollers are journaled in bearings provided by a center bracket 42 which is mounted on the midpoint of the cross bar 38 by a U-bolt of the special design shown at 46, 86, 98 and 126 and hereinafter described. The return roller is journaled in the lower end portions of the supports 36, directly beneath the rollers 12 and the cross bar 38.

Approximately midway its length each of the roller supports 36 has its outwardly facing flanges deeply right-angularly notched, as shown at 44, and the web of the support is drilled above and below the notch for reception of the threaded ends of a U-bolt 46.

The U-bolt 46, as well as the others herein identified, is of special design, having a semi-circular sinuous bight shaped with three identations spaced equally through 90° around the 180° of the bight curvature, so that when the assembly is mounted on the pair of longitudinals 30 by seating each of the latter in the pair of notches 44 of one of the roller supports 36, with the nuts on the U-bolts drawn up tightly to seat the curved surface of the longitudinal in the two notches, the bight of each U-bolt will contact the outboard surface of the adjacent longitudinal at only three points, with the intervening portions of the bight well spaced from the surface of the longitudinal. At the same time the inboard surface of the longitudinal will engage each of the flanges of the roller support 36 at only two points in the notch 44, where the lines defining the notch are tangent to the curved surface of the longitudinal. All this is best seen in FIG. 2

Continuing now with the assembly operation, additional intermediate assemblies are similarly mounted on the longitudinals in locations along the framework evenly spaced between the first installed endmost intermediates.

A tail assembly 50, consisting of an idler roller 52 journaled in end brackets 54, is then mounted on the tail end of the framework. Each bracket 54 includes a plate having a bearing for the roller at its outer end portion and having at the inner end portion a short length of channel stock 56, the flanges of which are punched to provide aligned round openings snugly receiving one of the longitudinals 30 on which the bracket is slidably mounted. Each bracket also has, between the roller bearing and the channel 56, and ear 58 threaded to receive a jack bolt 60 by which the whole tail assembly can be adjusted lengthwise of the framing, with sliding of the channels 56 along the longitudinals 30, so as properly to tension the belt which will be trained over the rollers, as will be hereinafter explained.

At the opposite end of the framework a head assembly 70 is next mounted. This component of the apparatus is in all respects similar to the tail assembly, except that it adds a motor 72, gear box 74, and transmission drive 76 mounted on a transverse supporting plate 78, and a drive shaft 80 for its roller 82. This assembly is completed and mounted in place for lengthwise adjustment on the framing by the same arrangement of brackets and jack bolts as used at the tail end, with the same minimal points of contact that have been described.

The belt may next be installed with its runs 14 and 24 trained over the respective upper and lower rollers and its tension properly set by adjustment of the jack bolts, as will be understood.

The belt may be of the conventional rubber or other elastomeric composition non-woven material as indicated in the drawings and commonly used in conveyors for handling small containers for food and the like incidental to filling and sealing operations.

With the foregoing assembling operations completed, it remains only to mount the assembly on a suitable series of legs.

In the FIGS. 1–5 embodiment, the legs are formed in pairs, one at each side of the conveyor, and each leg is formed in two sections. An upper section 84 is made of a short length of channel stock, with the upper portion of the web drilled to receive a pair of laterally spaced U-bolts 86. The channel flanges are notched right-angularly adjacent to these U-bolts for seating one of the longitudinals 30 with the bights of the two U-bolts passed around it and the nuts tightened up on the protruding shanks of the bolts. The notching and the bights are similar to the notches 44 and bights 46. The two upper leg sections, one at each opposite side of the conveyor, are rigidly connected by a stretcher bar 88, and the bottom end of each section is beveled to a narrow terminal edge as shown at 90.

For some installations, where a low elevation is required or permitted, as for mounting the entire apparatus on a table or other raised support, upper leg sections alone may be used, with the beveled lower ends set directly on the supporting surface. In other cases, however, where the apparatus is to be mounted on a floor and normal elevation to more or less table height is required, the legs may be completed by the addition of lower sections on which the upper leg sections are desirably made vertically adjustable. These lower sections are provided in two forms: individual lower sections 92, one for each upper leg section of a pair as shown in FIG. 4, or combined lower sections 94 each secured to the two opposite upper sections of a pair as shown in FIG. 2. In either case the lower section is formed of tubular pipe stock like that of the longitudinals 30 and its upper portion is secured to the lower portion of the upper leg section by the same type of U-bolts, applied in the same manner as heretofore described.

Engagement by point contact only, where notches in an upper leg section 84 are tangent to the curved surface of a section 92 or 94, is effected by cutting the web of the upper leg section and striking out a pair of vertically spaced, horizontally extending parallel ears 96 of substantially rectangular shape. These are notched to receive the curved surface of the lower leg section, and the connection is set in vertically adjusted relation by a U-bolt 98, the sinuous bight of which, like that of the bolt 46, makes contact with the curved surface at three points only, as shown in FIG. 5.

In FIG. 1 the two endmost leg structures are those employing individual lower sections, and the two intermediate structures are the combined lower sections 94. As there shown, and as more clearly appears in FIG. 2, the combined lower sections 94 are formed with a short foot 100 at the center of each. By this employing individual leg structures at the ends of the conveyor, lateral stability of the apparatus is assured, and by using combined leg structures intermediately, the number of locations at which a leg engages the floor is reduced, as will be understood.

FIGS. 6-10 illustrate modifications of the supporting leg structure that are preferred in some installations. As best shown in FIGS. 6 and 7, each of these structures includes a pair of lower leg sections 110, each similar to one of the lower leg sections 92 of the first described embodiment. The two sections 110 of each leg structure are connected in fixed spaced apart relation by a transverse tie channel member 112 which has a pair of round holes punched into its flanges near each end so as to be vertically aligned when the channel is disposed horizontally and so as to receive the two leg sections 110, one at each end of the channel, as shown in FIGS. 6 and 7. The channel is fixed at an adjusted height on the two leg sections by a pair of lock bolts or set screws 114 standing through vertically spaced holes in the channel web which are aligned in the plane of a diameter of the leg section. Nuts 116 may be welded to the channel web in alignment with the holes therein for engagement by the bolts, as shown in FIG. 8.

The leg structures each include also a pair of upper leg sections 118, each made of channel stock like that of the roller support channels 36. Each of these upper sections is securely fixed in non-adjustable relation to the channel 112 by a pair of bolts 120 standing through the flanges of the leg sections and interposed reinforcing sleeves 122 and into the web of the channel 112, as seen in FIG. 8, for engagement with a nut 124.

The length of the channel 112, and the spacing of the upper leg sections 118 on it, are such that, when the whole structure is mounted in position beneath the conveyor assembly, the lips or edges of the two sections 118 at the opposite sides of each leg structure will be spaced apart, transversely of the conveyor, slightly more than the distance between the two longitudinals 30. The flanges are notched in the upper portions of the sections, exactly as in the case of the notched upper leg sections 84 of the first described embodiment, to receive in minimal contact one of the longitudinals 30 and be secured thereto by a single U-bolt, as shown at 126 with its shanks standing through vertically spaced holes in the leg section web. Reference may be had to the showing of the U-bolts 46 and 86 and the relations thereof with the corresponding channel elements 36 and 84 in FIGS. 2 and 4 for an understanding of the minimal point contact of the longitudinals with the notches and with the points of the U-bolt bights, the arrangement being the same as in the FIG. 6 embodiment.

FIGS. 9 and 10 show a further modification of the leg structure that is useful in installations where the conveyor must be mounted on an inclined plane and where it is desirable to stand the lower leg sections in true vertical position. The leg structures here are generally the same as those of FIGS. 6-8 except that each upper leg section 118 is connected to the channel 112 by means permitting angular adjustment of the upper section. This is accomplished by means of a plate 130 having a flange bolted at 132 to the channel and provided with a central round hole and upper and lower arcuate slots 134. Bolts standing through the web of the upper leg section 118 and into the hole and slots permit the upper section to be pivoted around the center bolt and fixed in adjusted angular relation to the plate and lower leg section by tightening the bolts in the slots. In this way stable mounting by vertically standing legs can be effected in installations requiring conveyor operation between loading and discharge stations at substantially different levels.

It is believed that the principal objectives of providing a conveyor that can be maintained sanitary to a high degree because complete cleaning is facilitated will be recognized as accomplished by the structure herein disclosed. It will be noted that the modular and other components are well adapted to be set up in any of a wide range of overall conveyor lengths, and it will be evident that the parts are capable of being readily disassembled and if desired reassembled at new locations and/or in longer or shorter installations. However, these capabilities are attained without the expedient, heretofore generally considered necessary, of making each assembly permanent by filling crevices, cracks and other such recesses in the joints of abutting structural parts with weldment, caulking and the like to eliminate lodging space for foreign matter that must be removed by frequent cleaning operations. In the new construction provided by the present invention substantially all such recesses have been eliminated and replaced by mere point contact or very short line contact of abutting surfaces, with the surface areas adjacent thereto spaced apart sufficiently for effective flushing by jets of live steam or other sanitizing fluids used in conventional cleaning.

While of course specific materials constitute no part of the inventive concepts, it will be understood that wherever possible the parts, particularly the framing elements, the legs, bolts, etc., will be made of such easily cleaned metal as stainless steel or the equivalent.

It is also to be understood that changes in details of the embodiments selected to illustrate the invention, as well as additions thereto and subtractions therefrom, can be made within the spirit of the invention as defined by the appended claims.

I claim:

1. Sanitary endless belt conveyor apparatus comprising two laterally spaced co-planar parallel longitudinal frame members, each of tubular or rod-like shape, longitudinally spaced leg structures mounting said frame members on a floor surface, a plurality of longitudinally spaced belt-supporting transverse roller assemblies, and minimal contact means mounting each of said assemblies on said two frame members, each of said mounting means comprising an upright channel element at each end of the adjacent assembly journaling a roller thereof in the upper portion of said element and having outwardly extending side flanges provided with substantially right angular notches below said roller journal and receiving the adjacent frame member, and a U-bolt standing through the web of the channel element and having a sinuous bight embracing said frame member and contacting the surface thereof at no more than three spaced points, whereby each frame member is held seated in the notches and makes contact therewith only at the point where each notch line is tangent to the curved surface of the member, and whereby open spaces are left around the surface of the member between adjacent contacting points.

2. Sanitary endless belt conveyor apparatus as claimed in claim 1 in which each leg structure comprises an upright channel having the upper portion of its side flanges formed with substantially right angular notches, and a U-bolt standing through the web of the channel and having a sinuous bight embracing the member and contacting the surface thereof at no more than three spaced points, whereby the member is held seated in the notches and makes contact therewith at only the points where each notch line is tangent to the curved surface of the number, and whereby open spaces are left around the surface or the member between adjacent contacting points.

3. The conveyor apparatus claimed in claim 2, in which each leg structure includes a lower section having a tubular or rod-like upper portion vertically adjustably connected to said leg structure channel, said connection comprising a pair of vertically spaced substantially right angularly notched ears outwardly projecting from the web of the leg structure channel and a U-bolt standing through said web and having a sinuous bight embracing said upper portion of the lower section and contacting the surface thereof at no more than three spaced points, whereby said upper portion is held seated in the notches and makes contact therewith at only the points where each notch line is tangent to the curved surface of said portion, and whereby open spaces are left around the surface of said upper portion between adjacent contacting points.

4. The conveyor apparatus claimed in claim 2, in which each leg structure includes two upper sections and two lower sections, a transverse tie channel member vertically adjustably mounted on the two lower sections, and the two upper sections have their lower end portions connected in laterally spaced relation to the end portions of the transverse tie channel member.

5. The conveyor apparatus clained in claim 4, in which said last named connection includes plates carried by the transverse tie channel member at the end portions thereof and means connecting each upper leg section to one of said plates in angularly adjustable relation.

* * * * *